Patented Nov. 4, 1952

2,616,900

UNITED STATES PATENT OFFICE 2,616,900

SULFONATED N-SUBSTITUTED AMINO-ANTHRAQUINONES

Samuel von Allmen and Hans Eggenberger, Basel, Switzerland, assignors to Sandoz A. G., Basel, Switzerland, a Swiss firm No Drawing. Application May 23, 1949, Serial No. 94,936. In Switzerland May 27, 1948

4 Claims. (Cl. 260—371)

The present invention relates to blue vivid dyestuffs of the anthraquinone series and to a process for their manufacture.

U. S. Patent No. 1,821,043 discloses dyestuffs of the general formula

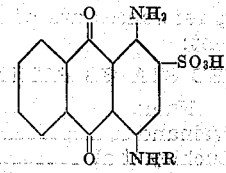

wherein R stands for a hydroaryl radical, which dye wool in exceedingly vivid blue shades. These dyestuffs, however, possess no levelling properties.

It has been found that valuable dyestuffs possessing good levelling properties can be obtained if the anthraquinone derivatives of the general formula

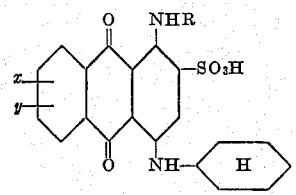

wherein R is hydrogen or alkyl and $x$ and $y$ are hydrogen or halogen, and wherein in the hydroaromatic radical one hydrogen atom is substituted by an aryl or aralkyl radical or two adjacent hydrogen atoms are parts of a benzene nucleus, are treated with sulphonating agents.

The new products are polysulphonic acids and differ from the monosulphonated dyestuffs of the above formula principally by the fact that they dye animal fibres such as wool, silk, etc. and artificial fibres such for example as nylon only in a sulphuric acid bath with equally good properties. This makes them suitable for the dyeing of wool, felt and similar fabrics. The sulfonation may be carried out in a known manner by dissolving the anthraquinone derivative at room temperature in concentrated sulphuric acid, sulphuric acid monohydrate, or halogen-sulphonic acid, whilst cooling by means of ice or water, allowing it to digest for some time and, if necessary, adding oleum until a sample tested in cold water is readily soluble therein. After pouring onto ice or into a salt solution the dyestuff will be isolated in the conventional manner, purified and worked up.

The dyestuffs thus produced dissolve readily in cold water.

The following examples illustrate the invention without limiting it. The quantity of sulphonating agents and also the temperature and duration of reaction can be varied within wide limits. The parts are parts by weight.

Example 1

5 parts of 1-amino-4-(1':2':3':4'-tetrahydro-2' - naphthylamino) - anthraquinone - 2 - sulphonic acid are introduced into 25 parts of sulphuric acid monohydrate with stirring and ice cooling. After a period of one hour the dyestuff has become considerably more soluble and is worked up. The fibre will take the vivid blue dyestuff properly only when applied in a sulphuric acid bath. Dissolved in concentrated sulphuric acid the color of the dyestuff is faintly greenish and the addition of a little paraformaldehyde causes it to turn greenish-blue. If the sulphonation is carried out at a higher temperature or with diluted oleum a still more soluble product is obtained.

Example 2

If in Example 1 the 1-amino-4-(1':2':3':4'-tetrahydro - 2' - naphthylamino) - anthraquinone-2-sulphonic acid is replaced by 1-amino-4-(1':2':3':4' - tetrahydro - 2' - naphthylamino)-6:7-dichlor-anthraquinone-2-sulphonic acid, a dyestuff of a somewhat greener shade is obtained.

Similar dyestuffs are obtained if 1-amino-4-(1':2':3':4' - tetrahydro - 2' - naphthylamino)-6:7-dichloranthraquinone-2-sulphonic acid is replaced by 1-amino-4-(1':2':3':4'-tetrahydro-2'-naphthylamino- or -4'-phenylhexahydroanilido)-6- or -7-chlor- or -bromanthraquinone-2-sulphonic acid.

Example 3

10 parts of 1-amino-4-(4'-phenylhexahydroanilido)-anthraquinone-2-sulphonic acid are dissolved in 60 parts of 8% oleum and stirred for about one hour at room temperature and then worked up. This gives an easily soluble dyestuff having similar properties to those of the dyestuff described in Example 1.

If 1 - amino - 4 - (4' - phenylhexahydroanilido)-anthraquinone-2-sulphonic acid is replaced by 1-amino-4-(2'-phenyl- or -benzyl-hexahydroanilido)-anthraquinone-2-sulphonic acid, a similar dyestuff is obtained.

Example 4

6 parts of 1-amino-4-(1':2':3':4'-tetrahydro-1' - naphthylamino) - anthraquinone - 2 - sulphonic acid are monosulphonated in 30 parts of sulphuric acid monohydrate by means of ice cooling. The disulphonated dyestuff is very readily soluble in water and is taken on by the fibre only in a sulphuric acid bath.

*Example 5*

5 parts of 1-amino-4-(4'-phenyl-hexahydro-anilido)-anthraquinone-2-sulphonic acid are introduced into 25 parts of sulphuric acid monohydrate while stirring and cooling by means of water. Then 10 parts of 28% oleum are added. After half an hour the dyestuff has become considerably more soluble and is worked up. The fibre will take the vivid blue dyestuff only in a sulphuric acid bath. Dissolved in concentrated sulphuric acid the color is faintly greenish and the addition of a little paraformaldehyde causes it to turn greenish-blue.

Instead of 28% oleum chlorosulphonic acid can also be used as sulphonating agent.

What we claim is:

1. An acid anthraquinone dyestuff corresponding to the formula

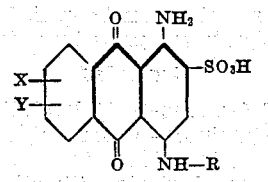

wherein each of X and Y stands for a member selected from the group consisting of hydrogen and halogen, and —R stands for a nucleo-sulphonated member selected from the group consisting of tetrahydronaphthyl, phenylcyclohexyl and benzylcyclohexyl radicals, the NH group connecting the cycloaliphatic nucleus of said member with the aromatic anthraquinone nucleus.

2. The anthraquinone dyestuff of the formula

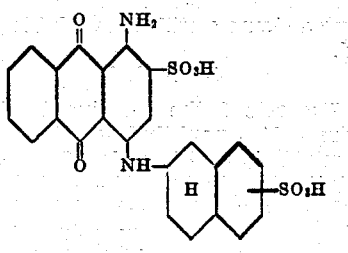

3. The anthraquinone dyestuff of the formula

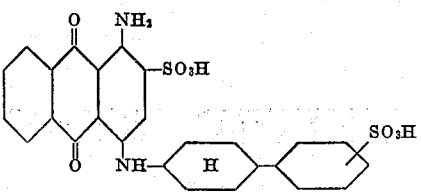

4. The anthraquinone dyestuff of the formula

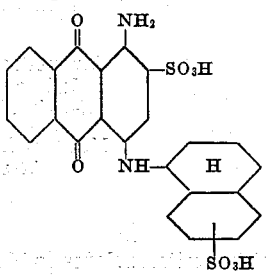

SAMUEL von ALLMEN.
HANS EGGENBERGER.

REFERENCES CITED

The following references are of record in the file of this patent:

UNITED STATES PATENTS

| Number | Name | Date |
|---|---|---|
| 1,821,043 | Weinand | Sept. 1, 1931 |
| 2,426,547 | Buckley et al. | Aug. 26, 1947 |

FOREIGN PATENTS

| Number | Country | Date |
|---|---|---|
| 355,697 | Great Britain | Aug. 26, 1931 |
| 381,954 | Great Britain | Oct. 3, 1932 |